(12) United States Patent
Won et al.

(10) Patent No.: US 12,363,435 B2
(45) Date of Patent: Jul. 15, 2025

(54) IMAGE SENSOR STABILIZATION

(71) Applicant: Samsung Electronics Co., Ltd., Suwon-si (KR)

(72) Inventors: Dongjoon Won, Suwon-si (KR); Seung Hak Lee, Suwon-si (KR); Minook Kim, Suwon-si (KR); Kyungsung Chu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 245 days.

(21) Appl. No.: 18/296,904

(22) Filed: Apr. 6, 2023

(65) Prior Publication Data
US 2024/0022817 A1 Jan. 18, 2024

(30) Foreign Application Priority Data
Jul. 13, 2022 (KR) .................. 10-2022-0086491
Oct. 24, 2022 (KR) .................. 10-2022-0137544

(51) Int. Cl.
| | | |
|---|---|---|
| *H04N 23/68* | (2023.01) | |
| *G02B 5/20* | (2006.01) | |
| *G03B 11/00* | (2021.01) | |
| *G03B 13/36* | (2021.01) | |
| *H04N 23/11* | (2023.01) | |

(52) U.S. Cl.
CPC ........... *H04N 23/687* (2023.01); *G02B 5/208* (2013.01); *G03B 11/00* (2013.01); *H04N 23/11* (2023.01); *G03B 13/36* (2013.01); *H04N 23/681* (2023.01)

(58) Field of Classification Search
None
See application file for complete search history.

(56) References Cited

U.S. PATENT DOCUMENTS

| | | |
|---|---|---|
| 10,126,633 B2 | 11/2018 | Avivi et al. |
| 10,310,290 B2 | 6/2019 | Yu et al. |
| 10,404,919 B2 | 9/2019 | Yu |
| 10,863,094 B2 | 12/2020 | Sharma et al. |
| 11,199,182 B2 | 12/2021 | Miller et al. |
| 11,333,951 B2 | 5/2022 | Kim |
| 2012/0025633 A1 | 2/2012 | Lee et al. |
| 2015/0110480 A1* | 4/2015 | Suzuka ............... G02B 27/646 396/55 |
| 2017/0244899 A1 | 8/2017 | Abe et al. |
| 2021/0258491 A1* | 8/2021 | Park ..................... G03B 13/36 |
| 2022/0082848 A1* | 3/2022 | Han ...................... H04N 23/55 |
| 2022/0094853 A1 | 3/2022 | Xu et al. |
| 2022/0103744 A1 | 3/2022 | Hsu et al. |

FOREIGN PATENT DOCUMENTS

| | | |
|---|---|---|
| KR | 10-2021-0061096 A | 5/2021 |
| KR | 10-2297487 B1 | 9/2021 |

* cited by examiner

*Primary Examiner* — Christopher Braniff
(74) *Attorney, Agent, or Firm* — Fish & Richardson P.C.

(57) ABSTRACT

An image sensor stabilizer includes a lower frame, an upper frame on the lower frame and supporting an image sensor, a first actuator and a second actuator between the lower frame and the upper frame and is configured to drive the upper frame to move in a first direction relative to the lower frame, a third actuator between the lower frame and the upper frame and configured to drive the upper frame to move in a second direction relative to the lower frame, and a guide ball between the lower frame and the upper frame. The first actuator and the second actuator are spaced apart from each other in the second direction. The image sensor stabilizer can be used in a camera module.

20 Claims, 17 Drawing Sheets

IMAGE SENSOR STABILIZATION

CROSS-REFERENCE TO RELATED APPLICATION

This U.S. non-provisional application claims priority under 35 U.S.C § 119 to Korean Patent Applications No. 10-2022-0086491 filed on Jul. 13, 2022, and No. 10-2022-0137544 filed on Oct. 24, 2022, in the Korean Intellectual Property Office, the disclosures of which are hereby incorporated by reference in their entirety.

BACKGROUND

With the development of electronic devices, various user electronic devices are applied to diverse fields. Such electronic devices are released in various sizes in accordance with functions and user's preference. For example, the electronic device may include a large-sized touch display for securing wide visibility and convenience of manipulation. The electronic device may include at least one camera module. For example, the electronic device may include at least one camera module located on the display or around the display.

SUMMARY

The subject matter of the present disclosure relates to image sensor stabilization, including image sensor stabilization in camera modules and camera module drive methods.

In some implementations, an image sensor stabilization, such as in camera modules and camera module drive methods, includes performing horizontal and rotational movements of an image sensor within a small area so as to reduce tremor of the image sensor caused by shaking of the camera module.

In some implementations, three dimensional movement can be achieved with a single-layered guide ball. As a result, the size of the camera module, in certain cases, can have reduced overall size relative to camera modules using multiple guide balls for three-dimensional motion.

In some implementations, image sensor stabilization includes securing an image sensor in place even when no power is applied to the image sensor stabilizer. For example, in a state where no power is applied to an actuator, an attractive force between a fixing magnet and a yoke can fix the image sensor on a certain position. Accordingly, in some implementations, damage to the image sensor caused by an arbitrary movement thereof may be prevented.

Advantages of the presently disclosed subject matter are not limited to the examples mentioned above, and other advantages may be understood to those skilled in the art from the following description.

In general, innovative aspects of the subject matter described in this specification can be embodied in an image sensor stabilizer that includes: a lower frame; an upper frame on the lower frame and supporting an image sensor; a first actuator and a second actuator between the lower frame and the upper frame and configured to drive the upper frame to move in a first direction relative to the lower frame; a third actuator between the lower frame and the upper frame and configured to drive the upper frame to move in a second direction relative to the lower frame, the second direction intersecting the first direction; and a guide ball between the lower frame and the upper frame. The first actuator and the second actuator may be spaced apart from each other in the second direction.

In general, in another aspect, subject matter of the present disclosure can be embodied in an image sensor stabilizer that includes: a lower frame; an upper frame on the lower frame; a first actuator and a second actuator configured to drive the upper frame to move in a first direction relative to the lower frame; a third actuator and a fourth actuator configured to drive the upper frame to move in a second direction relative to the lower frame, the second direction intersecting the first direction; and a guide ball between the lower frame and the upper frame. The lower frame may provide a lower reception hole that receives the guide ball. The upper frame may provide an upper reception hole on the lower reception hole. Each of a first length in the first direction of the upper reception hole and a second length in the second direction of the upper reception hole may be greater than a diameter of the guide ball, such that the guide ball may be movable in each of the first direction and the second direction in the upper reception hole.

In general, in another aspect, subject matter of the present disclosure can be embodied in a camera module stabilizer that includes: an image sensor; an image sensor stabilizer that drives the image sensor to move; and an auto-focus apparatus on the image sensor stabilizer. The image sensor stabilizer may include: a lower frame; an upper frame on the lower frame; a first actuator that drives the upper frame to move in a first direction relative to the lower frame; a second actuator that drives the upper frame to move in a second direction relative to the lower frame, the second direction intersecting the first direction; and a guide ball between the lower frame and the upper frame. A center of the first actuator may be spaced apart in the second direction from a center of the image sensor.

In general, in another aspect, subject matter of the present disclosure can be embodied in a camera module drive method that includes: using an image sensor stabilizer to drive an image sensor to horizontally move in a first direction; driving the image sensor to horizontally move in a second direction that intersecting the first direction; and driving the image sensor to rotationally move about an axis parallel to a third direction that intersects each of the first direction and the second direction. The image sensor stabilizer may include: a lower frame; an upper frame on the lower frame and supporting the image sensor; and a first actuator and a second actuator configured to drive the upper frame to move in the first direction relative to the lower frame. The first actuator and the second actuator may be spaced apart from each other in the second direction. The step of driving the image sensor to rotationally move about the axis parallel to the third direction may include supplying the first actuator and the second actuator with powers whose values are different from each other.

Details of other example implementations are included in the description and drawings.

DETAIL PARTED DESCRIPTION

Figure 1:
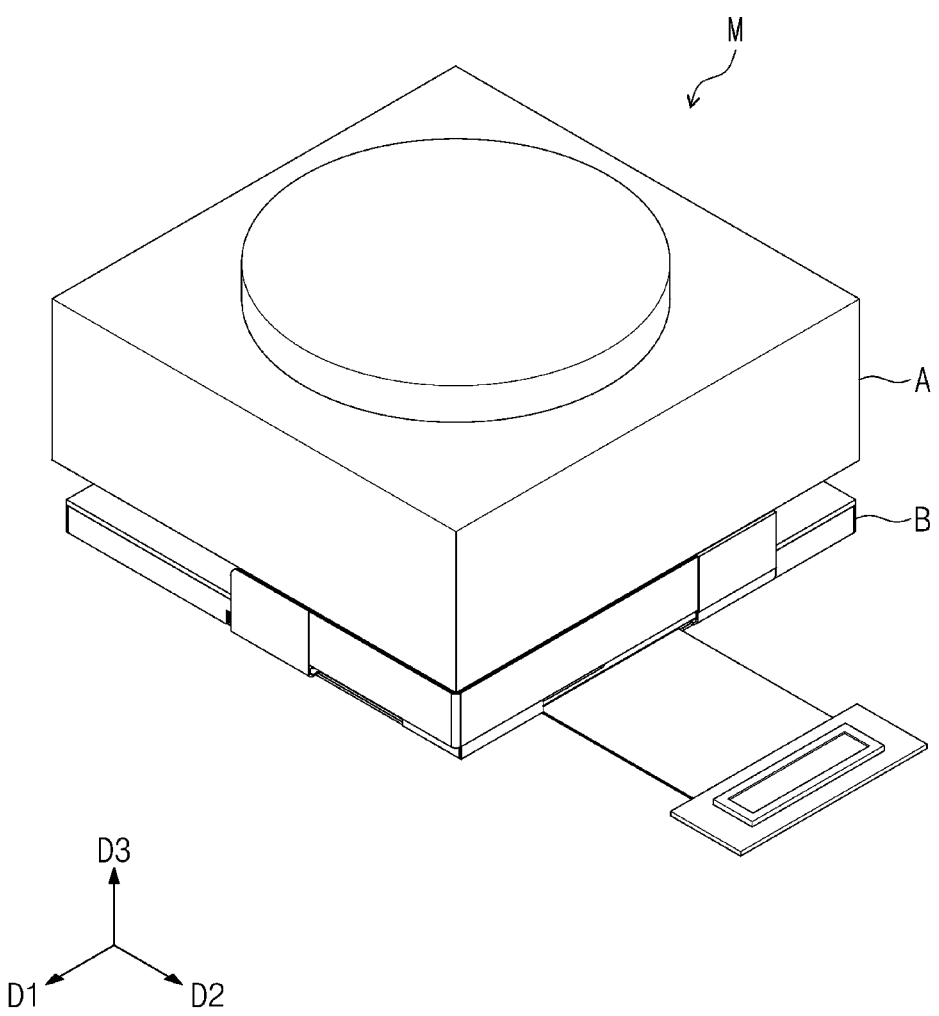
FIG. 1 illustrates a perspective view showing an example of a camera module.

The following will now describe some implementations of the present disclosure with reference to the accompanying drawings. Like reference numerals may indicate like components throughout the description.

FIG. 1 illustrates a perspective view showing an example of a camera module.

In this description, symbol D1 indicates a first direction, symbol D2 indicates a second direction that intersects the first direction D1, and symbol D3 indicates a third direction that intersects each of the first direction D1 and the second direction D2. Each of the first and second directions D1 and D2 may be called a horizontal direction. The third direction D3 may be called a vertical direction.

Referring to FIG. 1, a camera module M is provided. The camera module M may indicate a certain device that generates an electric signal from an externally received optical signal. The camera module M may be used in combination with an electronic device. For example, the camera module M may be used in combination with a smart-phone, a laptop computer, or so forth. A detailed description thereof will be further discussed below with reference to FIG. 17.

The camera module M may include an image sensor (see IMS of FIG. 3), an image sensor stabilizer B and an auto-focus apparatus A.

The image sensor IMS may convert an optical signal into an electric signal. The image sensor IMS may include a charge coupled device (CCD) or CMOS image sensor (CIS). An electronic device may receive an electric signal converted in the image sensor IMS. The image sensor IMS will be further discussed in detail below.

The image sensor stabilizer B may drive the image sensor IMS to move. For example, the image sensor stabilizer B may drive the image sensor IMS to parallel move in a horizontal direction. Alternatively, the image sensor stabilizer B may drive the image sensor IMS to rotate about an axis parallel to the third direction D3. The image sensor stabilizer B may drive the image sensor IMS to move in a direction opposite to that in which the camera module M moves. In this sense, the image sensor stabilizer B may be configured to move the image sensor IMS in a direction opposite to a movement direction of the camera module M so as to detect and compensate for the movement of the camera module M. It may thus be possible to correct a shake of the image sensor IMS. For example, the image sensor stabilizer B may be an apparatus for optical image stabilization (OIS). The image sensor stabilizer B will be further discussed in detail below.

The auto-focus apparatus A may be positioned on the image sensor stabilizer B. A lens may be disposed in the auto-focus apparatus A. The auto-focus apparatus A may vertically move the lens. Therefore, the auto-focus apparatus A may adjust a focus of the lens. The auto-focus apparatus A may include a drive mechanism configured to move the lens.

Figure 2:
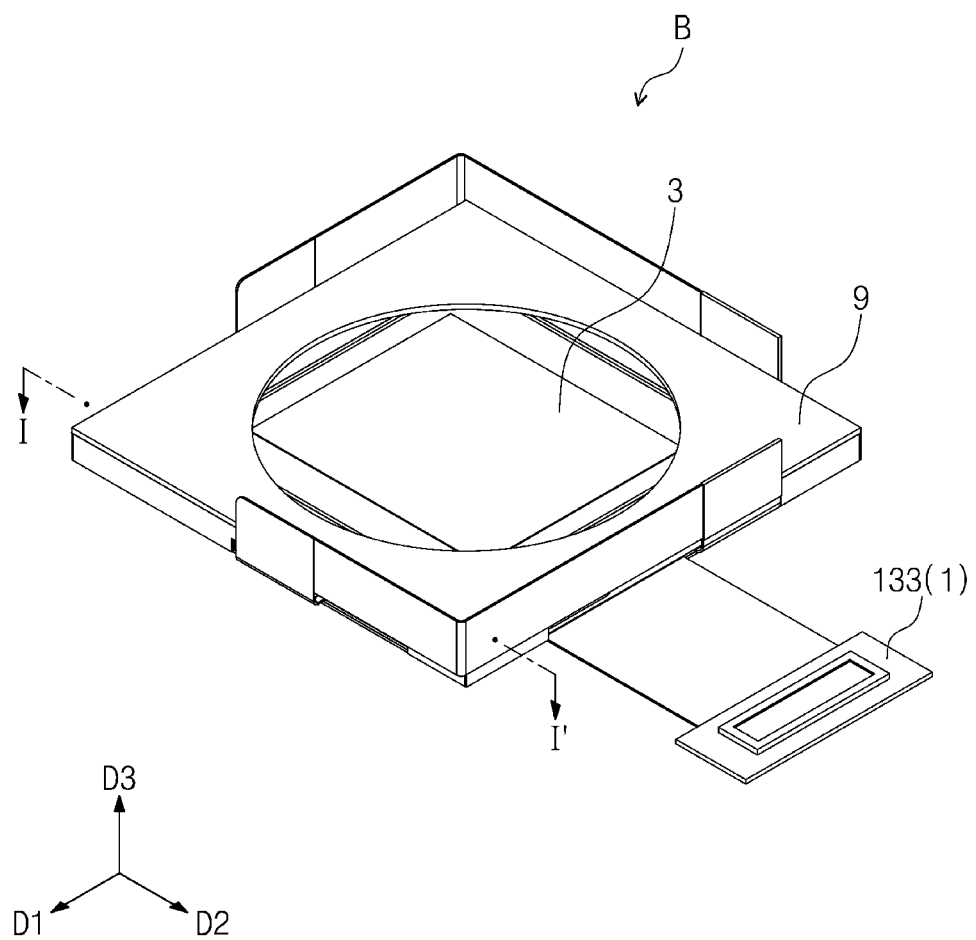
FIG. 2 illustrates a perspective view showing an example of an image sensor stabilizer.
Figure 3:
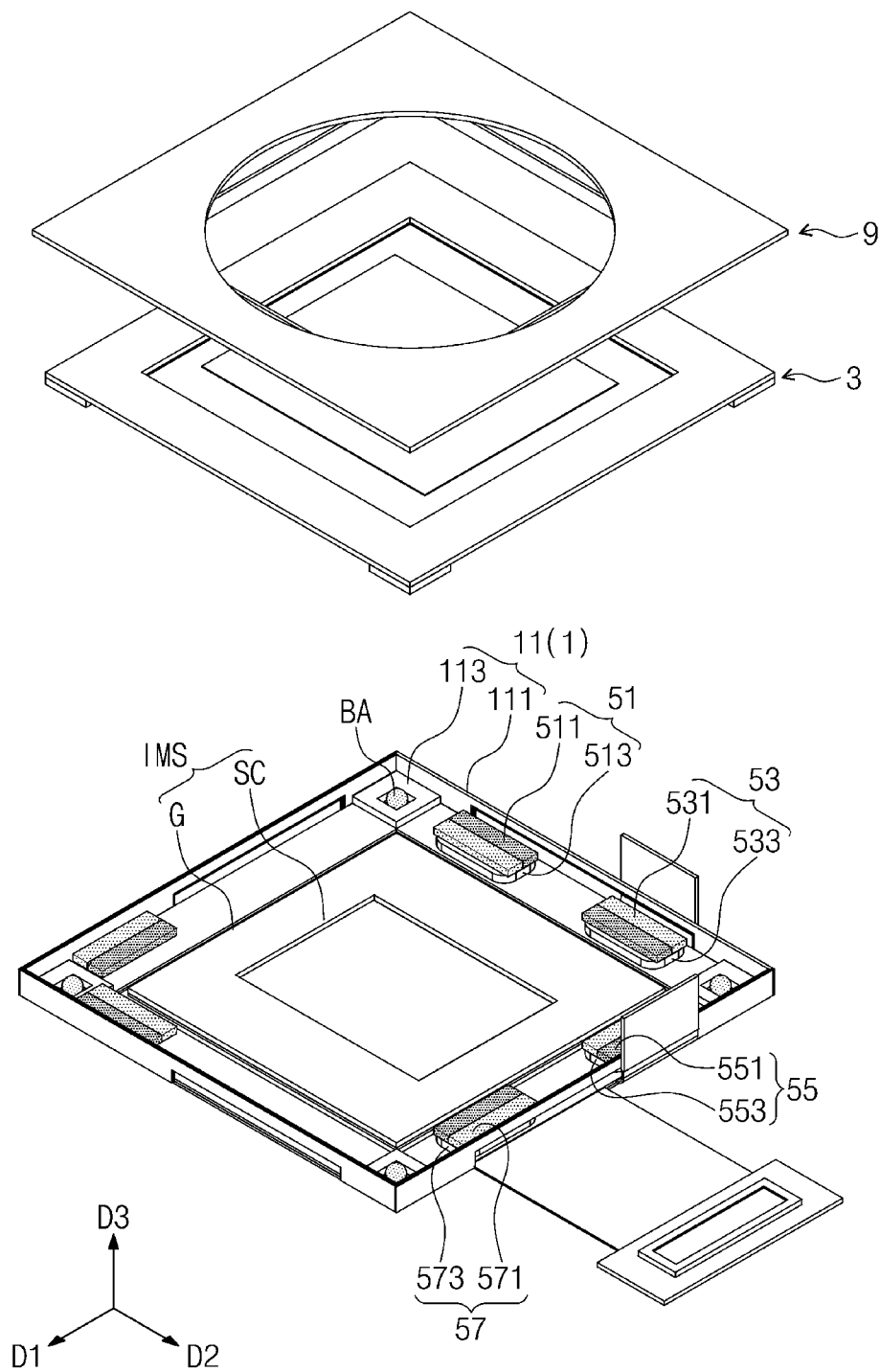
FIG. 3 illustrates a partial exploded perspective view showing an example of an image sensor stabilizer.
Figure 4:
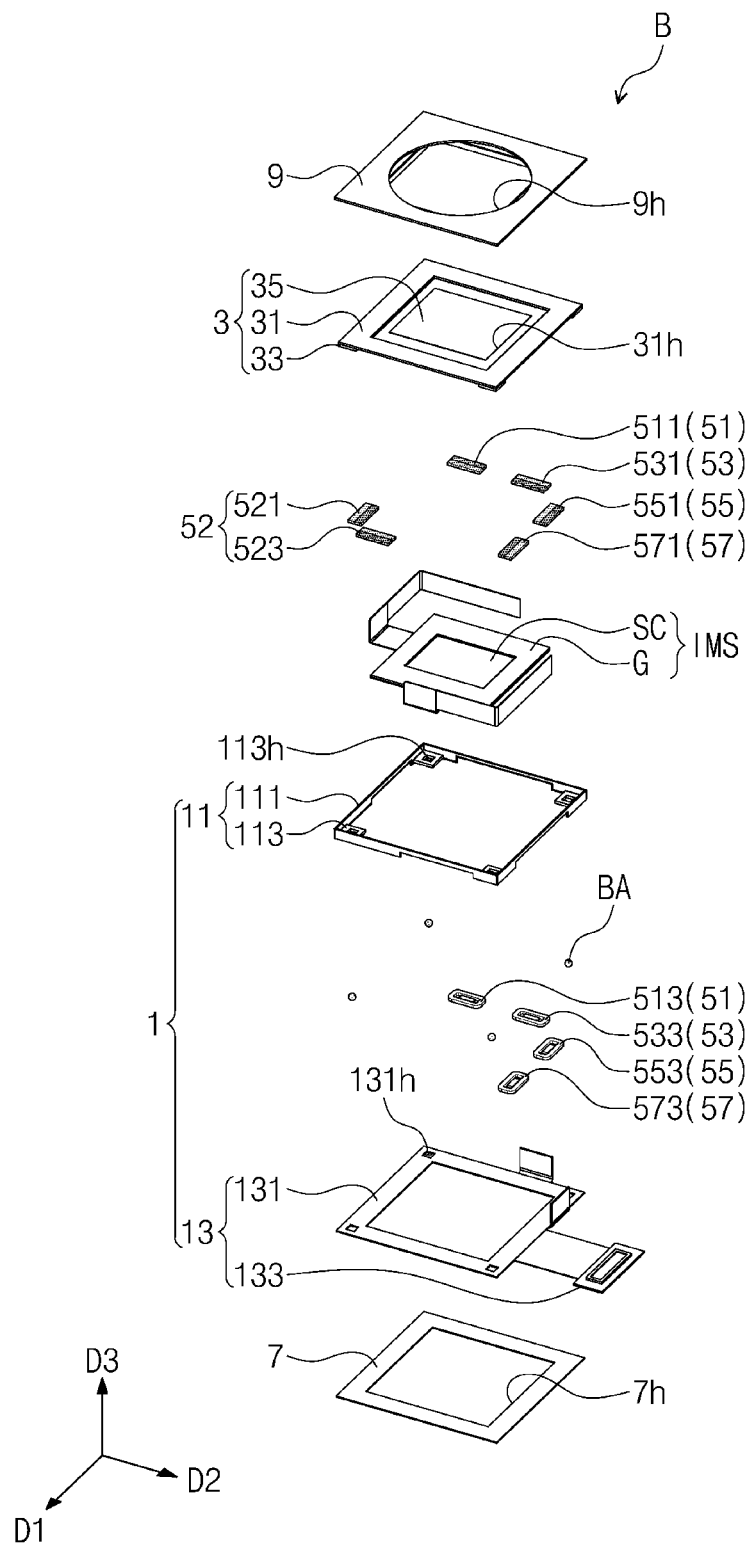
FIG. 4 illustrates a detailed exploded perspective view showing an example of an image sensor stabilizer.

FIG. 2 illustrates a perspective view showing an example of an image sensor stabilizer. FIG. 3 illustrates a partial exploded perspective view showing an example of an image sensor stabilizer. FIG. 4 illustrates a detailed exploded perspective view showing an example of an image sensor stabilizer.

Referring to FIGS. 2, 3, and 4, the image sensor stabilizer B includes a lower frame 1, an upper frame 3, an actuator, a fixing magnet 52, a guide ball BA, a yoke 7, and a cover 9.

The lower frame 1 may be fixed to one side of a certain device. For example, the lower frame 1 may be fixed on one side of an electronic device (see P of FIG. 17). The lower frame 1 may be positioned below the image sensor IMS. Alternatively, when viewed in plan, a portion of the lower frame 1 may surround the image sensor IMS. The lower frame 1 may provide a lower reception hole 113h. A portion of the guide ball BA may be inserted into the lower reception hole 113h. The lower frame 1 may include a ball guide structure 11 and a substrate 13.

The ball guide structure 11 may include a ball guide body 111 and a reception block 113. The ball guide body 111 may have a rectangular frame shape. The reception block 113 may provide the lower reception hole 113h. For example, the lower reception hole 113h may be provided in the reception block 113. The lower reception hole 113h may be an opening that is downwardly recessed to a certain depth from a top surface of the reception block 113. In some implementations, the reception block 113 may be provided in plural. For example, as shown in FIG. 4, four reception blocks 113 may be provided. The four reception blocks 113 may be disposed spaced apart from each other in the first direction D1 and the second direction D2. In this case, the lower reception hole 113h may also be provided in plural. A single reception block 113 and a single lower reception hole 113h will be discussed below.

The substrate 13 may be coupled below the ball guide structure 11. The substrate 13 may include a substrate frame 131 and a connection substrate 133. The substrate frame 131 may have a rectangular frame shape. The substrate frame 131 may be associated with the ball guide structure 11. For example, the substrate frame 131 may be combined with an inner surface of the ball guide structure 11. The substrate frame 131 may provide an extension reception hole 131h. The extension reception hole 131h may be positioned below the lower reception hole 113h. The extension reception hole 131h may be connected to the lower reception hole 113h. The extension reception hole 131h may vertically penetrate the substrate frame 131, but the present disclosure is not limited thereto. The connection substrate 133 may be connected to the substrate frame 131. The connection substrate 133 may include a printed circuit board (PCB).

In FIG. 4, the ball guide structure 11 and the substrate 13 are separated components, but the present disclosure is not limited thereto. For example, the ball guide structure 11 and the substrate 13 may be integrally formed into a single unitary piece. Alternatively, the substrate 13 may be omitted.

As another alternative, the ball guide structure 11 may be omitted. In this case, the lower reception hole 113*h* may be provided in the substrate 13.

The upper frame 3 may be positioned on the lower frame 1. The upper frame 3 may support the image sensor IMS. The upper frame 3 may be movable relative to the lower frame 1. For example, the upper frame 3 may move in the first direction D1, e.g., parallel to the lower frame 1. For another example, the upper frame 3 may move in the second direction D2, e.g., parallel to the lower frame 1. The upper frame 3 may be rotationally movable relative to the lower frame 1. The image sensor IMS may be fixedly coupled to the upper frame 3. Therefore, the image sensor IMS may be movable together with the upper frame 3. The upper frame 3 may provide an upper reception hole (see upper reception hole 33*h* of FIG. 8). A portion of the guide ball BA may be inserted into the upper reception hole 33*h*. The upper frame 3 may include an upper frame body 31, a ball reception member 33, and an infrared ray color filter (IRCF) 35.

The upper frame body 31 may have a rectangular frame shape. The upper frame body 31 may provide an upper central hole 31*h*. The upper central hole 31*h* may expose the image sensor IMS.

Figure 5:
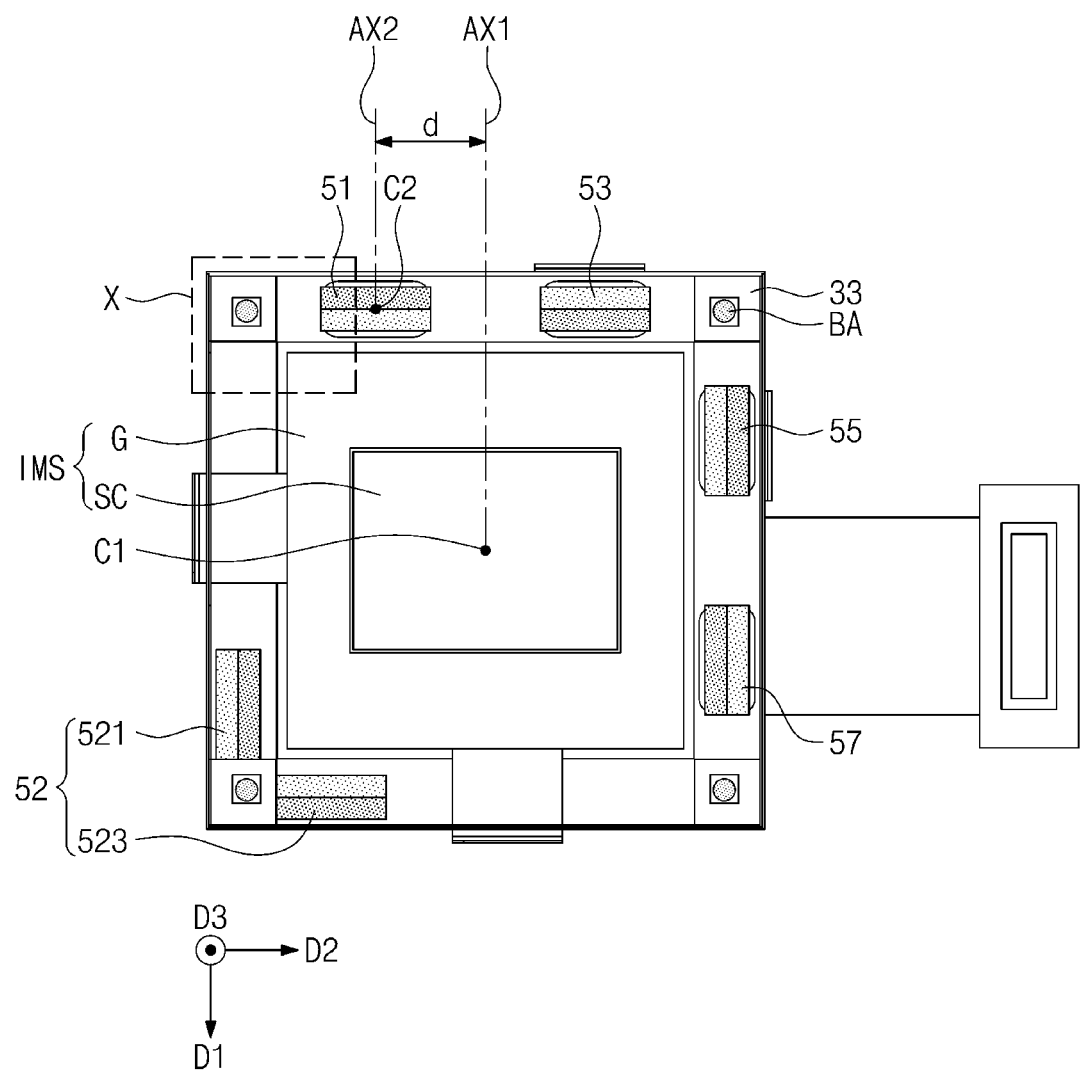
FIG. 5 illustrates a plan view showing an example of an image sensor stabilizer.

The ball reception member 33 may be associated with the upper frame body 31. The ball reception member 33 may provide the upper reception hole 33*h* (see FIG. 8). For example, the upper reception hole 33*h* may be provided in the ball reception member 33. The upper reception hole 33*h* may be an opening that is upwardly recessed from a bottom surface of the ball reception member 33. The upper reception hole 33*h* may be positioned above the lower reception hole 113*h*. In some implementations, multiple ball reception members 33 may be provided. For example, as shown in FIG. 5, four ball reception member 33 may be provided. The four ball reception members 33 may be spaced apart from each other in the first direction D1 and the second direction D2. In this case, multiple upper reception holes 33*h* may also be provided. A single ball reception member 33 and a single upper reception hole 33*h* will be discussed below in the interest of convenience The IRCF 35 may be associated with the upper frame body 31. The IRCF 35 may be disposed in the upper central hole 31*h*. The IRCF 35 may be disposed on the image sensor IMS. The IRCF 35 may filter an infrared ray. For example, the IRCF 35 may filter an infrared ray introduced into the image sensor IMS.

The actuator may drive the upper frame 3 to move. For example, the actuator may drive the upper frame 3 in the first direction D1, e.g., parallel relative to the lower frame 1. Alternatively, the actuator may drive the upper frame 3 in the second direction D2, e.g., parallel relative to the lower frame 1. As another alternative, the actuator may drive the upper frame 3 to rotationally move relative to the lower frame 1. The actuator may be positioned, for example, between the upper frame 3 and the lower frame 1. The actuator may be a voice coil motor (VCM). In this case, the actuator may include a magnet and a coil. The magnet may be fixedly coupled to the upper frame 3. For example, the magnet may be fixedly coupled to a bottom surface of the upper frame body 31. The coil may be fixedly coupled to the lower frame 1. For example, the coil may be fixedly coupled to a top surface of the substrate frame 131. Multiple actuators may be provided. For example, there may be provided a first actuator 51, a second actuator 53, a third actuator 55, and a fourth actuator 57.

The first actuator 51 may drive the upper frame 3 to move in the first direction D1 relative to the lower frame 1. The first actuator 51 may include a first magnet 511 and a first coil 513. The first magnet 511 may be fixedly coupled to the upper frame 3. The first coil 513 may be fixedly coupled to the lower frame 1. The first magnet 511 may be positioned on the first coil 513. The first magnet 511 may be movable relative to the first coil 513. For example, when a power is applied to the first coil 513, the first magnet 511 may move relative to the first coil 513. A detailed description thereof will be further discussed below.

The second actuator 53 may drive the upper frame 3 to move in the first direction D1 relative to the lower frame 1. The second actuator 53 may include a second magnet 531 and a second coil 533. The second magnet 531 may be fixedly coupled to the upper frame 3. The second coil 533 may be fixedly coupled to the lower frame 1. The second magnet 531 may be positioned on the second coil 533. The second magnet 531 may be movable relative to the second coil 533. For example, when a power is applied to the second coil 533, the second magnet 531 may move relative to the second coil 533. A detailed description thereof will be further discussed below.

The third actuator 55 may drive the upper frame 3 to move in the second direction D2 relative to the lower frame 1. The third actuator 55 may include a third magnet 551 and a third coil 553. The third magnet 551 may be fixedly coupled to the upper frame 3. The third coil 553 may be fixedly coupled to the lower frame 1. The third magnet 551 may be positioned on the third coil 553. The third magnet 551 may be movable relative to the third coil 553. For example, when a power is applied to the third coil 553, the third magnet 551 may move relative to the third coil 553. A detailed description thereof will be further discussed below.

The fourth actuator 57 may drive the upper frame 3 to move in the second direction D2 relative to the lower frame 1. The fourth actuator 57 may include a fourth magnet 571 and a fourth coil 573. The fourth magnet 571 may be fixedly coupled to the upper frame 3. The fourth coil 573 may be fixedly coupled to the lower frame 1. The fourth magnet 571 may be positioned on the fourth coil 573. The fourth magnet 571 may be movable relative to the fourth coil 573. For example, when a power is applied to the fourth coil 573, the fourth magnet 571 may move relative to the fourth coil 573. A detailed description thereof will be further discussed below.

The fixing magnet 52 may be positioned between the upper frame 3 and the lower frame 1. For example, the fixing magnet 52 may be coupled to the bottom surface of the upper frame body 31. The fixing magnet 52 may be provided in plural. For example, as shown in FIG. 4, there may be provided a first fixing magnet 521 and a second fixing magnet 523. The fixing magnet 52 and the yoke 7 can cause an electromagnetic field that generates an attractive force between the fixing magnet 52 and the yoke 7. Therefore, at the time when no actuator operates, the attractive force between the fixing magnet 52 and the yoke 7 may rigidly place the upper frame 3 on a certain position on the lower frame 1.

The guide ball BA may be positioned between the upper frame 3 and the lower frame 1. A portion of the guide ball BA may be inserted into the upper reception hole 33*h*. Another portion of the guide ball BA may be inserted into the lower reception hole 113*h*. When the upper frame 3 moves relative to the lower frame 1, the guide ball BA may limit a range of movement of the upper frame 3. Multiple guide balls BA may be provided. For example, as shown in FIG. 4, four guide balls BA may be provided. The four guide balls BA may be disposed spaced apart from each other in the first direction D1 and the second direction D2. The four guide balls BA can be coplanar in a single layer, e.g., at a same height along the third direction D3, between the lower and upper frame. The example of a single guide ball BA will be discussed in the interest of convenience, but the description set forth herein can be applied to other guide balls BA as well. The guide ball BA will be further described in detail below.

The yoke 7 may support the lower frame 1. The yoke 7 may be coupled below the lower frame 1. The yoke 7 may include metal. Therefore, an attractive force may be generated between the yoke 7 and the fixing magnet 52.

The cover 9 may be positioned on the upper frame 3. The cover 9 may protect the upper frame 3. The cover 9 may provide a cover hole 9h. The cover hole 9h may expose the image sensor IMS.

The image sensor IMS may include a sensor chip SC and a sensor substrate G. The sensor chip SC may include a charge coupled device (CCD) or CMOS image sensor (CIS). The sensor substrate G may support the sensor chip SC. When viewed in plan, the sensor substrate G may surround the sensor chip SC.

Figure 6:
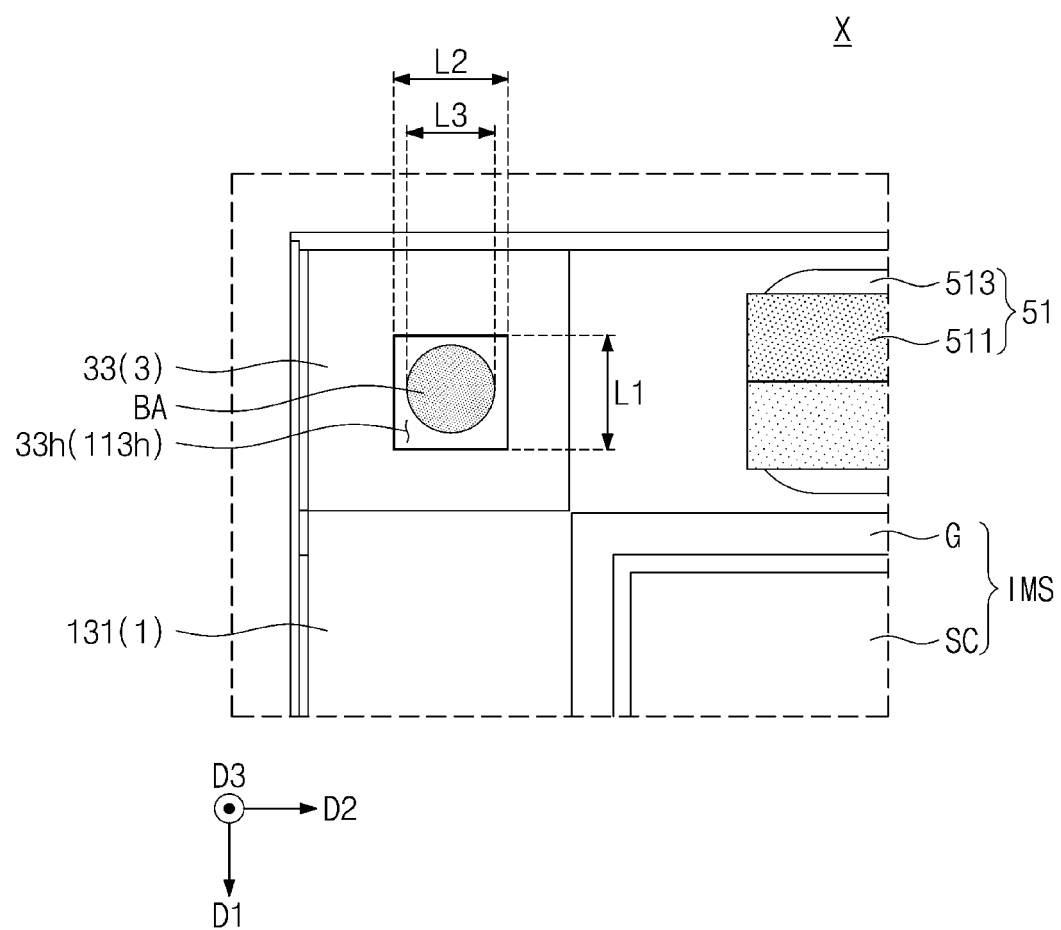
FIG. 6 illustrates an enlarged plan view showing section X of FIG. 5.
Figure 7:
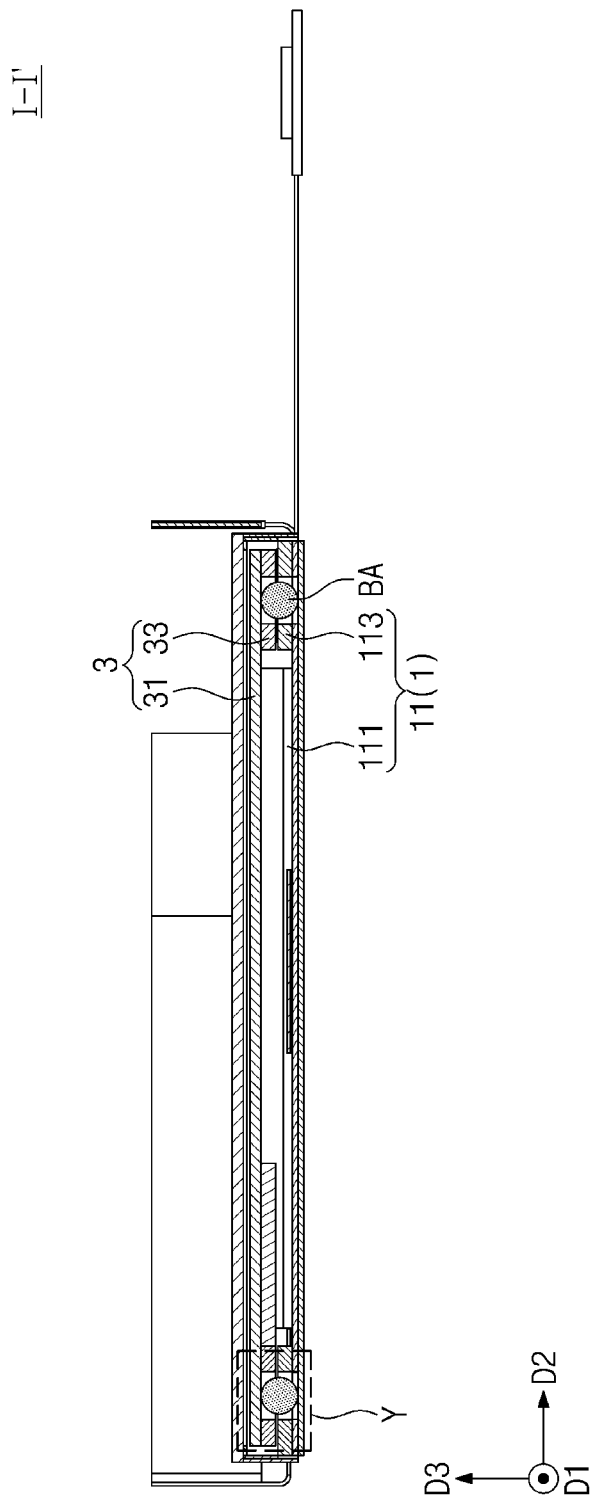
FIG. 7 illustrates a cross-sectional view taken along line I-I' of FIG. 2.
Figure 8:
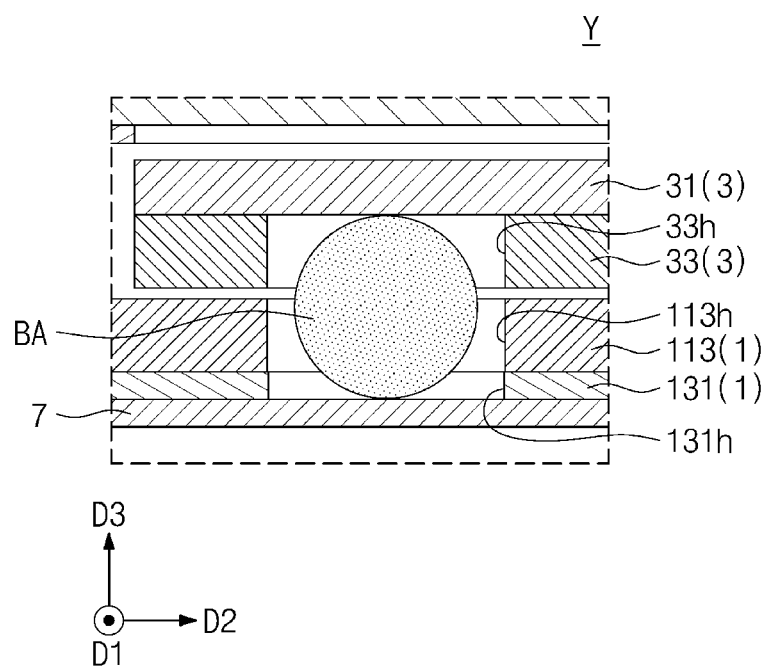
FIG. 8 illustrates an enlarged cross-sectional view showing section Y of FIG. 7.

FIG. 5 illustrates a plan view showing an example of an image sensor stabilizer. FIG. 6 illustrates an enlarged plan view showing section X of FIG. 5. FIG. 7 illustrates a cross-sectional view taken along line I-I' of FIG. 2. FIG. 8 illustrates an enlarged cross-sectional view showing section Y of FIG. 7.

Referring to FIG. 5, a center C2 of the first actuator 51 may be spaced apart in the second direction D2 from a center C1 of the image sensor IMS. For example, an axis AX2 in the first direction D1 of the first actuator 51 is spaced apart at a certain distance d from an axis AX1 in the first direction D1 of the image sensor IMS. Therefore, when the first actuator 51 pushes the upper frame 3 in the first direction D1, a rotational moment may occur in the upper frame 3. A detailed description thereof will be further discussed below.

The first actuator 51 and the second actuator 53 may be disposed spaced apart from each other in the second direction D2. The third actuator 55 may be spaced apart in the first direction D1 from each of the first actuator 51 and the second actuator 53. The third actuator 55 and the fourth actuator 57 may be disposed spaced apart from each other in the first direction D1.

Referring to FIGS. 6, 7, and 8, the upper reception hole 33h and the lower reception hole 113h overlap each other when viewed in plan. The guide ball BA may be inserted into the upper reception hole 33h and/or the lower reception hole 113h.

A first length L1 indicates a length in the first direction D1 of the upper reception hole 33h. The first length L1 may range from about 1.0 mm to about 1.6 mm. For example, the first length L1 may be about 1.3 mm. The present disclosure, however, is not limited thereto.

A second length L2 indicates a length in the second direction D2 of the upper reception hole 33h. The second length L2 may range from about 1.0 mm to about 1.6 mm. For example, the second length L2 may be about 1.3 mm. The second length L2 may be substantially the same as the first length L1. In this case, the upper reception hole 33h may have a square shape when viewed in plan. The present disclosure, however, is not limited thereto.

From a plan view, the upper reception hole 33h and lower reception hole 113h have a planar area, e.g., a circle with diameter d, if either of the upper reception hole 33h or lower reception hole 113 is a sphere with diameter d. In some implementations, the upper reception hole 33h may have a planar area substantially the same as or similar to that of the lower reception hole 113h. The present disclosure, however, is not limited thereto.

The guide ball BA may have a diameter L3 less than the first length L1. Therefore, the guide ball BA may be movable in the first direction D1 in the upper reception hole 33h.

The diameter L3 of the guide ball BA may be less than the second length L2. Therefore, the guide ball BA may be movable in the second direction D2 in the upper reception hole 33h.

The first length L1 may be about 1.1 times to about 1.5 times the diameter L3 of the guide ball BA. For example, the first length L1 may be about 1.3 times the diameter L3 of the guide ball BA. The present disclosure, however, is not limited thereto. When discussing ranges, "about" or "substantially" can refer to a range of values slightly above or below the indicated amount, e.g., a range spanning 10% more or less than the indicated amount, 5% more or less than the indicated amount, or 1% more or less than the indicated amount.

Figure 9:
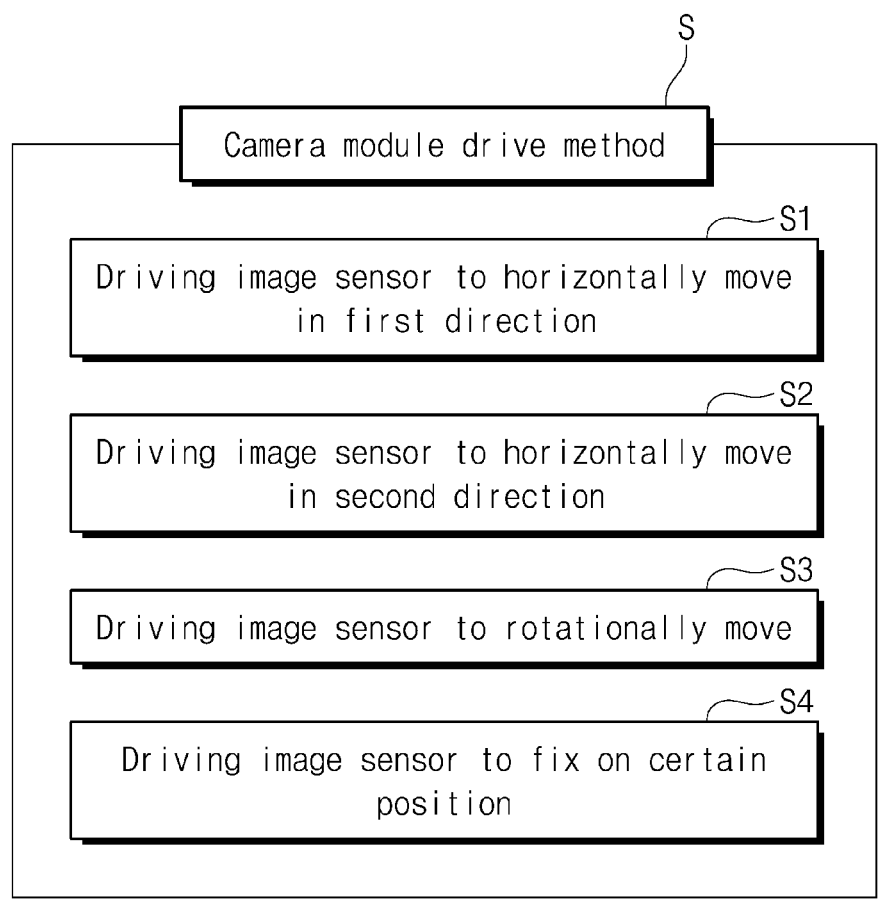
FIG. 9 illustrates a flow chart showing an example of a camera module drive method.

FIG. 9 illustrates an example of a flow chart showing a camera module drive method S.

The camera module drive method S may be a way of driving the camera module (see M of FIG. 1) discussed with reference to FIGS. 1 to 8. The camera module drive method S includes driving an image sensor to horizontally move in a first direction (S1), driving the image sensor to horizontally move in a second direction (S2), driving the image sensor to rotationally move (S3), and driving the image sensor to fix on a certain position (S4).

It is illustrated that the steps S1, S2, S3, and S4 are arranged in the foregoing sequence, but the drive sequence may be changed.

The camera module drive method S of FIG. 9 will be further discussed in detail below with reference to FIGS. 10 to 16.

Figure 10:
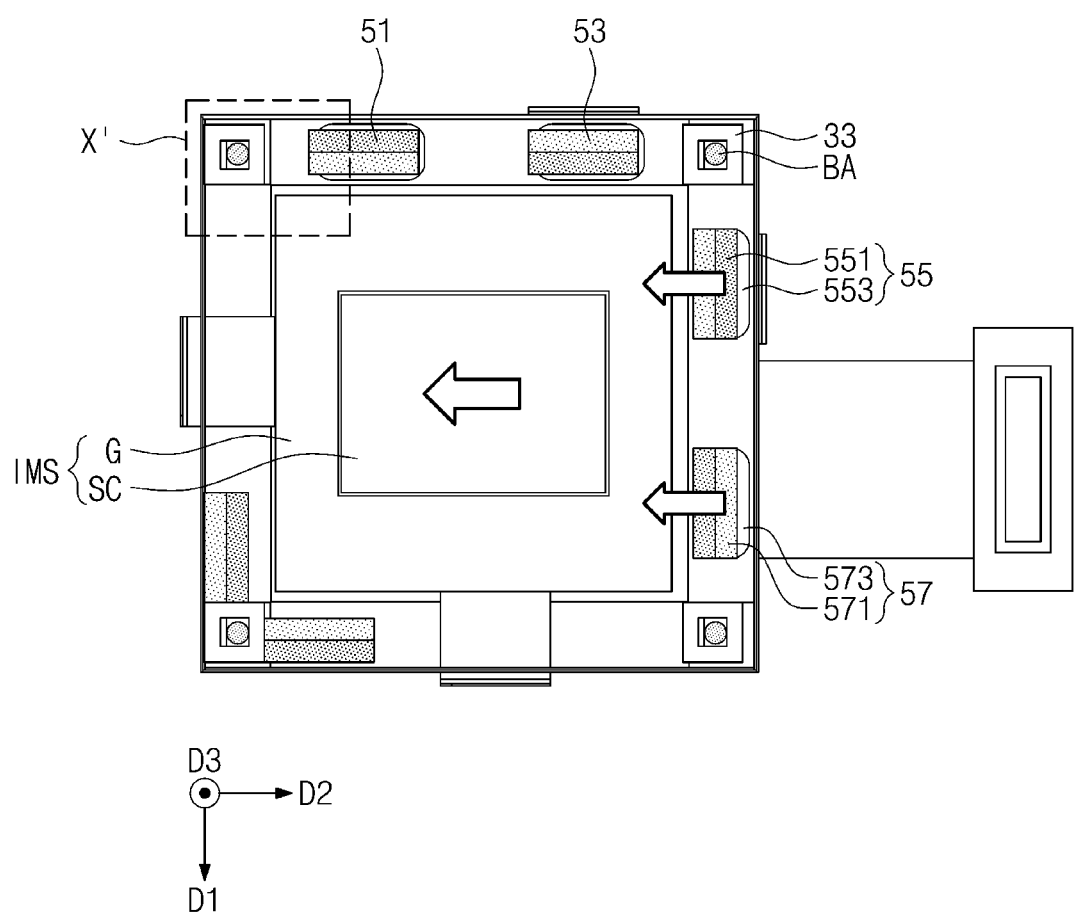
FIGS. 10 to 12 illustrate plan and cross-sectional views showing an example of a procedure of horizontally moving an image sensor.
Figure 11:
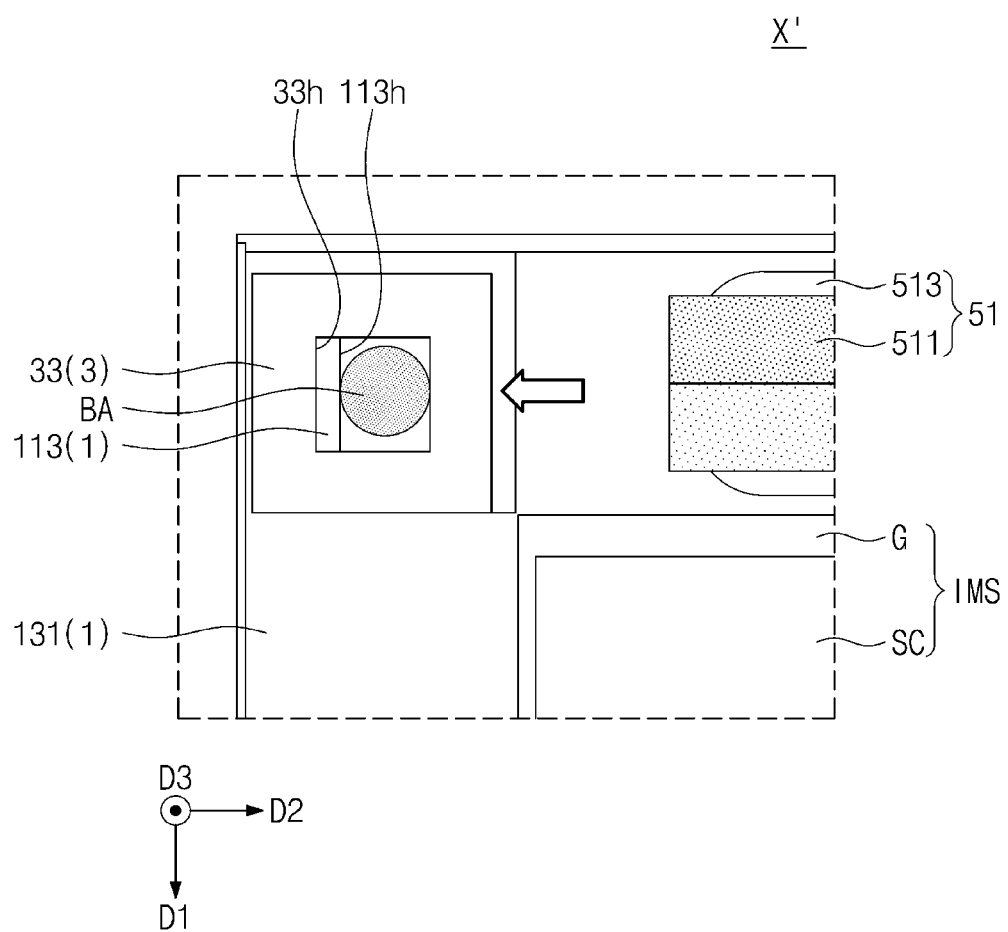
Figure 12:
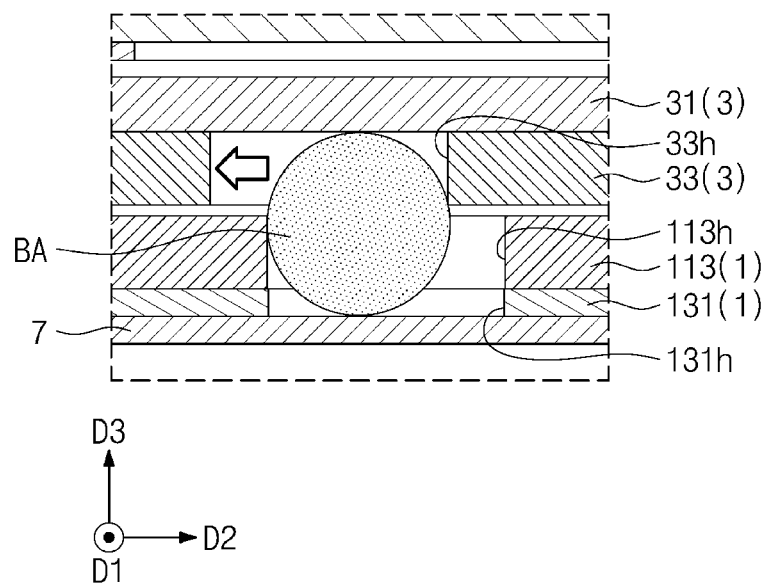

FIGS. 10 to 12 illustrate plan and cross-sectional views showing an example of a procedure of horizontally moving an image sensor.

Referring to FIGS. 9 and 10 to 12, the horizontal movement in the second direction (S2) may be performed by using the third actuator 55 and/or the fourth actuator 57. For example, the third actuator 55 may push the ball reception member 33 in the second direction D2 and/or a direction opposite to the second direction D2. In this stage, the third magnet 551 may move, on the third coil 553, in the second direction D2 and/or the direction opposite to the second direction D2. Therefore, the upper frame 3 may move, relative to the lower frame 1, in the second direction D2 and/or the direction opposite to the second direction D2. In this procedure, the first actuator 51 and/or the second actuator 53 may apply a force so that the ball reception member 33 may not move in the first direction D1.

The movement of the upper frame 3 may be limited by the guide ball BA. For example, as shown in FIGS. 11 and 12, when one side of the guide ball BA contacts an inner surface that defines the upper reception hole 33h and/or the lower reception hole 113h, the movement of the upper frame 3 may be terminated.

Figure 13:
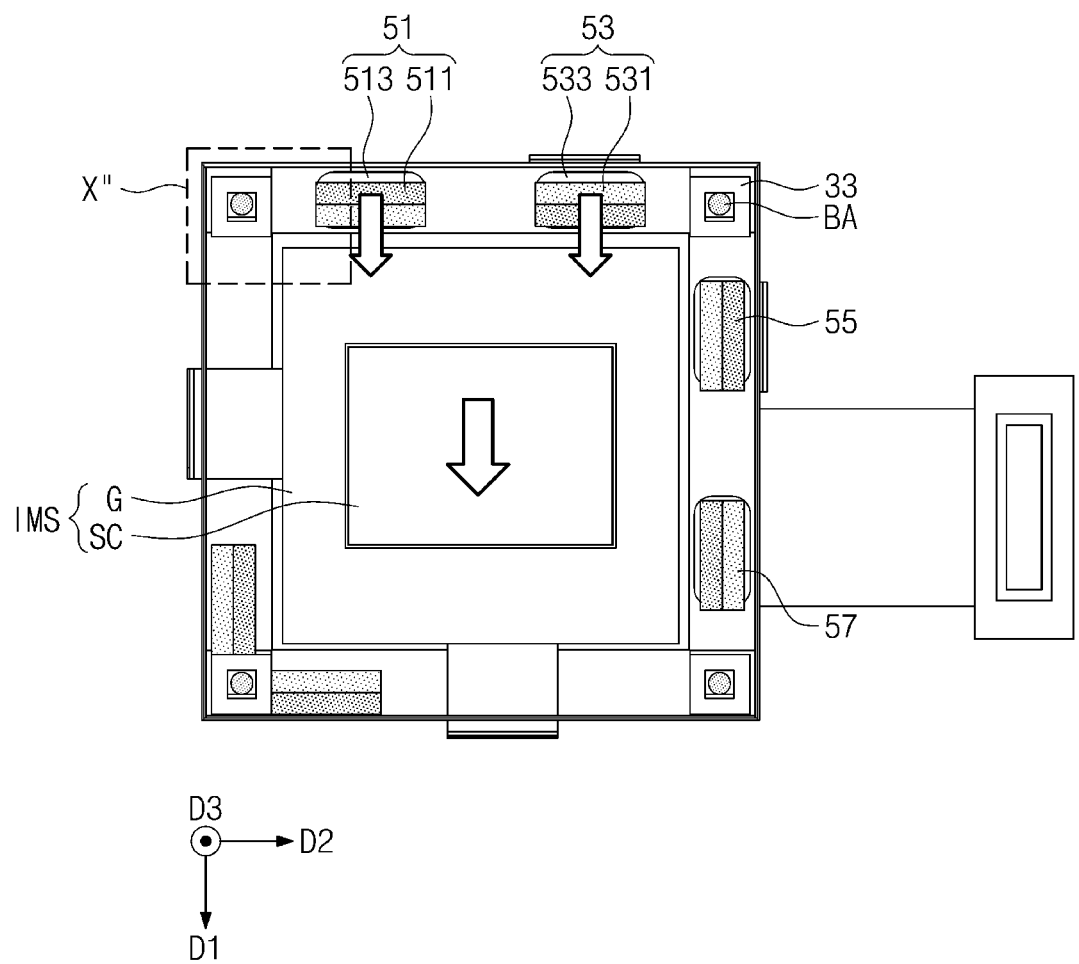
FIGS. 13 and 14 illustrate plan views showing an example of a procedure of horizontally moving an image sensor.
Figure 14:
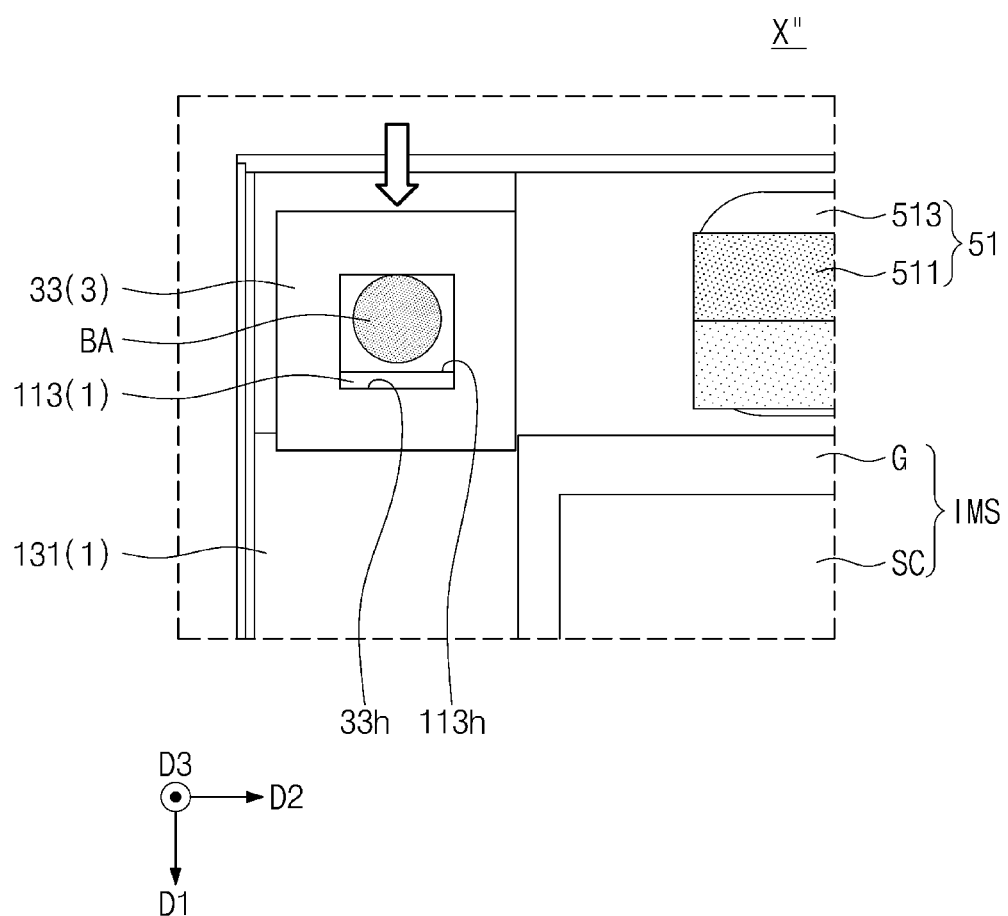

FIGS. 13 and 14 illustrate plan views showing an example of procedure of horizontally moving an image sensor.

Referring to FIGS. 9, 13, and 14, the horizontal movement in the first direction (S1) may be performed by using the first actuator 51 and/or the second actuator 53. For example, the first actuator 51 may push the ball reception member 33 in the first direction D1 and/or a direction opposite to the first direction D1. In this stage, the first magnet 511 may move, on the first coil 513, in the first direction D1 and/or the direction opposite to the first direction D1. Therefore, the upper frame 3 may move, relative to the lower frame 1, in the first direction D1 and/or the direction opposite to the first direction D1. In this procedure, the third actuator 55 and/or the fourth actuator 57 may apply a force so that the ball reception member 33 may not move in the second direction D2.

The movement of the upper frame 3 may be limited by the guide ball BA. For example, as shown in FIG. 14, when one side of the guide ball BA contacts an inner surface that defines the upper reception hole 33h and/or the lower reception hole 113h, the movement of the upper frame 3 may be terminated.

Figure 15:
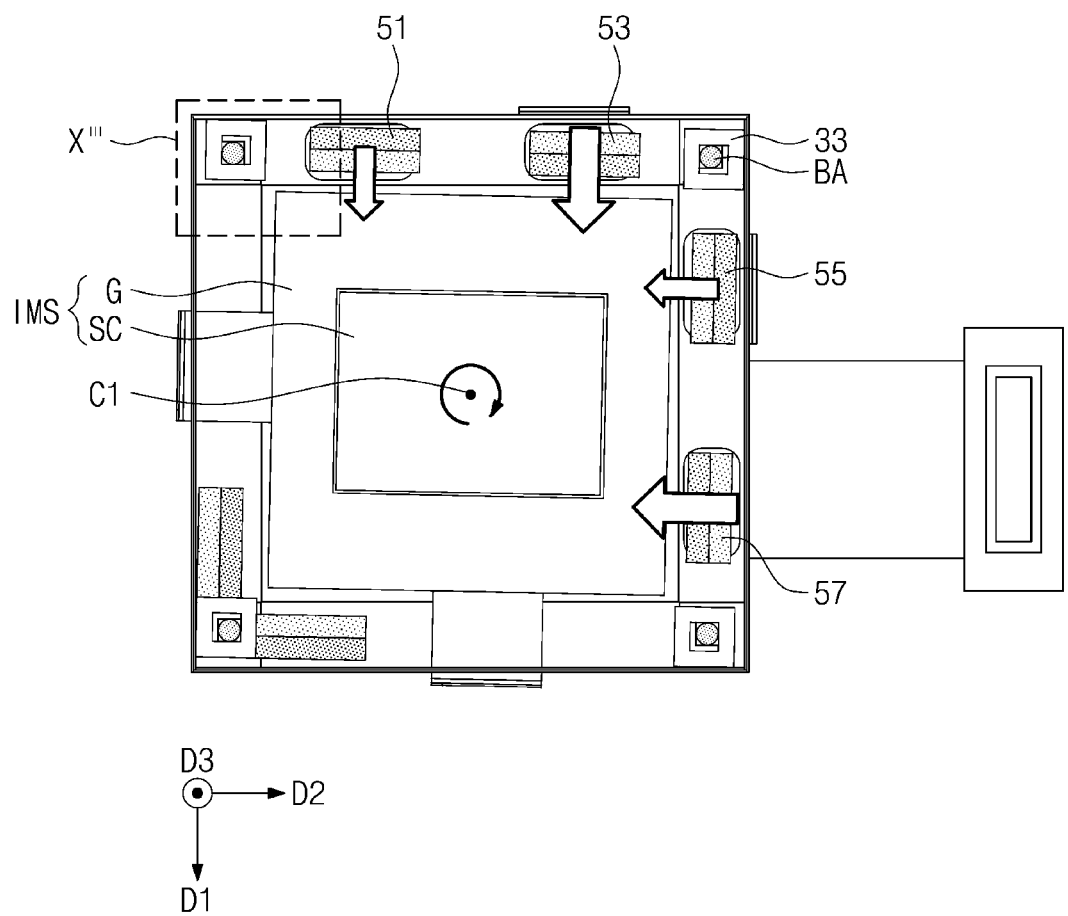
FIGS. 15 and 16 illustrate plan views showing an example of a procedure of rotationally moving an image sensor.
Figure 16:
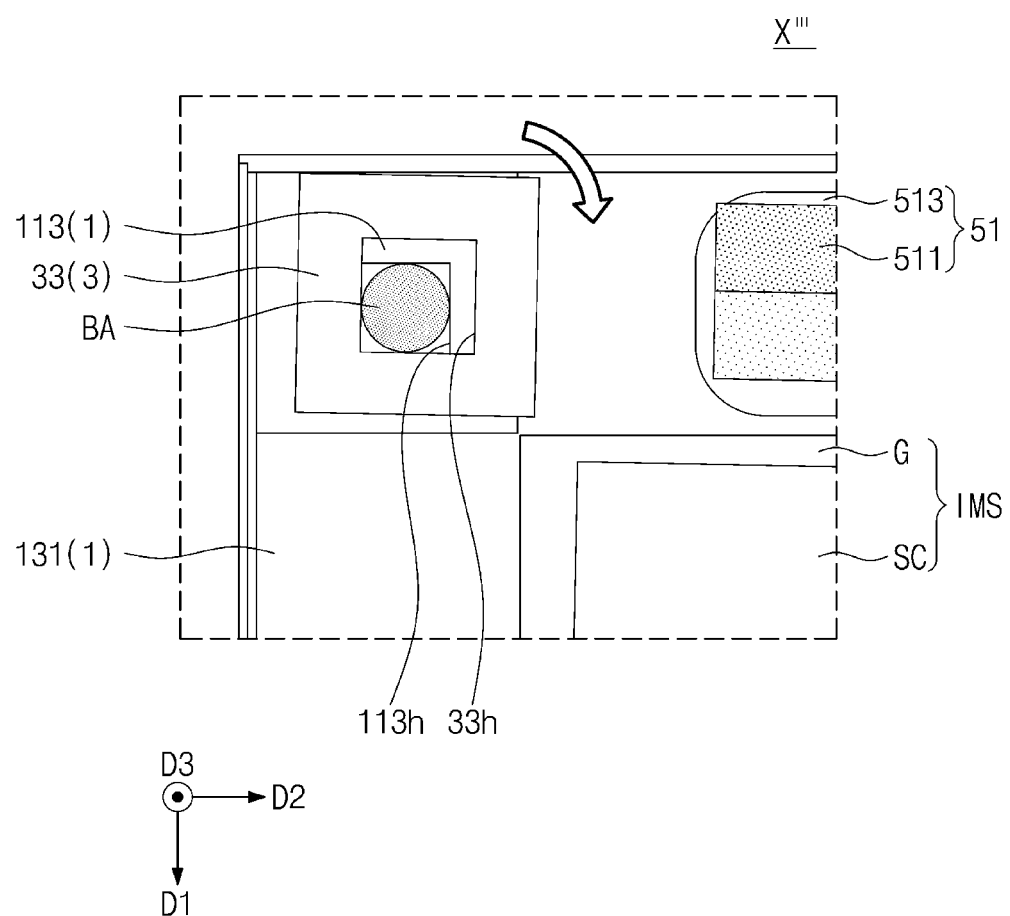

FIGS. 15 and 16 illustrate plan views showing an example of a procedure of rotationally moving an image sensor.

Referring to FIGS. 9, 15, and 16, the rotational movement (S3) may include supplying the first actuator 51 and the second actuator 53 with powers whose values are different from each other. For example, a power applied to the second actuator 53 may be greater than that applied to the first actuator 51. In addition, a power applied to the fourth actuator 57 may be greater than that applied to the third actuator 55. In this case, the upper frame 3 may rotationally move relative to the lower frame 1. For example, the upper frame 2 may rotationally move, relative to the lower frame 1, about an axis parallel to the third direction D3. The upper frame 3 may rotate about the center C1 of the image sensor IMS. The rotation of the upper frame 3 may drive the image sensor IMS to rotate.

Referring back to FIGS. 4 and 9, the fixation of the image sensor (S4) may include allowing the attractive force between the yoke 7 and the fixing magnet 52 to rigidly place the upper frame 3 on a specific location on the yoke 7. For example, in a state where no power is applied to the actuator, the attractive force between the yoke 7 and the fixing magnet 52 may fix the upper frame 3 on a specific location on the yoke 7.

Figure 17:
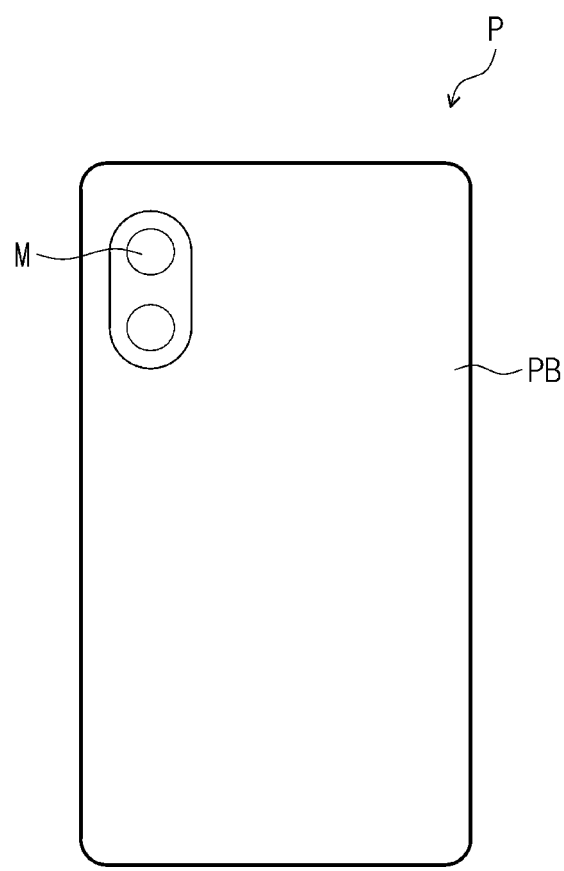
FIG. 17 illustrates a plan view showing an example of an electronic device to which a camera module is applied.

FIG. 17 illustrates a plan view showing an example of an electronic device to which is applied a camera module.

Referring to FIG. 17, the camera module M may be applied to an electronic device P. The electronic device P may be, for example, a smart-phone. In this case, the camera module M is associated with a housing PB. The present disclosure, however, is not limited thereto, and the camera module M may be applied to other electronic devices.

According to the disclosed description, in some implementations, an image sensor stabilizer, a camera module including the same, and a camera module drive method can drive an image sensor to rotate. In addition, the direction of driving the image sensor can be horizontal or other directions. Consequently, even when the camera module shakes, a tremor of the image sensor can be reduced.

According to the disclosed description, in some implementations an image sensor stabilizer, a camera module including the same, and a camera module drive method, three types of movement may be achieved with only a single-layered guide ball. For example, multiple types of guide balls may not be needed to accomplish three moving actions. Accordingly, the camera module can have a smaller volume compared to a camera module with multiple types of guide balls.

According to the disclosed description, in some implementations, an image sensor stabilizer, a camera module including the same, and a camera module drive method can secure an image sensor in place even when no power is applied to the image sensor stabilizer. For example, in a state where no power is applied to an actuator, an attractive force between a fixing magnet and a yoke may be used to fix the image sensor on a certain position. Accordingly, in some implementations, damage to the image sensor caused by an arbitrary movement thereof may be prevented.

According to the disclosed description, in some implementations, an image sensor stabilizer, a camera module including the same, and a camera module drive method can drive an image sensor to rotate.

According to the disclosed description, in some implementations, a relatively small volume of an image sensor stabilizer and a camera module including the same, may be sufficient to achieve horizontal and rotation movements.

According to the disclosed description, in some implementations, an image sensor stabilizer, a camera module including the same, and a camera module drive method can fix an image sensor on a certain position even when no power is applied.

Effects of the present inventive concepts are not limited to the mentioned above, other effects which have not been mentioned above will be clearly understood to those skilled in the art from the following description.

Although the present disclosure have been described in connection with some examples of the present disclosure illustrated in the accompanying drawings, it will be understood to those skilled in the art that various changes and modifications may be made without departing from the technical spirit and essential feature of the present disclosure. It therefore will be understood that the examples described above are just illustrative but not limitative in all aspects.

What is claimed is:

1. An image sensor stabilizer, comprising:
 a lower frame;
 an upper frame on the lower frame and supporting an image sensor;
 a first actuator and a second actuator, wherein each of the first actuator and second actuator is between the lower frame and the upper frame, and wherein the first actuator and second actuator are configured to drive the upper frame to move in a first direction relative to the lower frame;
 a third actuator between the lower frame and the upper frame and configured to drive the upper frame to move in a second direction relative to the lower frame, the second direction intersecting the first direction; and
 a guide ball between the lower frame and the upper frame,
 wherein the first actuator and the second actuator are spaced apart from each other in the second direction and are located on the same side of the image sensor.

2. The image sensor stabilizer of claim 1, wherein each of the first actuator and the second actuator includes a corresponding:
 a coil fixed to the lower frame; and
 a magnet fixed to the upper frame.

3. The image sensor stabilizer of claim 1, wherein the third actuator is spaced apart in the first direction from the first actuator and the second actuator.

4. The image sensor stabilizer of claim 1, further comprising a fourth actuator between the lower frame and the upper frame and configured to drive the upper frame to move in the second direction relative to the lower frame,
 wherein the third actuator and the fourth actuator are spaced apart from each other in the first direction.

5. The image sensor stabilizer of claim 1, further comprising a yoke that supports the lower frame,
 wherein the yoke includes metal.

6. The image sensor stabilizer of claim 1, wherein the lower frame includes:
a ball guide structure; and
a substrate coupled below the ball guide structure,
wherein the ball guide structure provides a lower reception hole that receives the guide ball.

7. The image sensor stabilizer of claim 1, wherein
the upper frame comprises an upper reception hole that receives the guide ball, and
each of a length in the first direction of the upper reception hole and a length in the second direction of the upper reception hole is large enough to allow the guide ball to pass through the upper reception hole in the first and second directions.

8. An image sensor stabilizer, comprising:
a lower frame defining an opening;
an upper frame on the lower frame;
a first actuator and a second actuator configured to drive the upper frame to move in a first direction relative to the lower frame, wherein the first and second actuators are aligned along a second direction on a first side of the opening;
a third actuator and a fourth actuator configured to drive the upper frame to move in the second direction relative to the lower frame, the second direction intersecting the first direction, wherein the third and fourth actuators are aligned along the first direction on a second side of the opening; and
a guide ball between the lower frame and the upper frame,
wherein the lower frame provides a lower reception hole that receives the guide ball,
wherein the upper frame provides an upper reception hole on the lower reception hole, and
wherein each of a first length in the first direction of the upper reception hole and a second length in the second direction of the upper reception hole is large enough to allow the guide ball to pass through the upper reception hole in the first and second directions.

9. The image sensor stabilizer of claim 8, wherein the first length and the second length are the same.

10. The image sensor stabilizer of claim 8, wherein the first length is about 1.1 times to about 1.5 times a diameter of the guide ball.

11. The image sensor stabilizer of claim 8, wherein the first length is in a range of about 1.0 mm to about 1.6 mm.

12. The image sensor stabilizer of claim 8, wherein a planar area of the upper reception hole is substantially the same as a planar area of the lower reception hole.

13. The image sensor stabilizer of claim 8, further comprising a fixing magnet between the upper frame and the lower frame,
wherein the fixing magnet is spaced apart from each of the first actuator, the second actuator, the third actuator, and the fourth actuator.

14. The image sensor stabilizer of claim 13, further comprising a yoke that supports the lower frame,
wherein the yoke includes metal, and
wherein the yoke and the fixing magnet produce an electromagnetic field that generates an attractive force between the yoke and fixing magnet.

15. A camera module, comprising:
an image sensor;
an image sensor stabilizer that drives the image sensor to move; and
an auto-focus apparatus on the image sensor stabilizer,
wherein the image sensor stabilizer includes
a lower frame,
an upper frame on the lower frame,
a first actuator that drives the upper frame to move in a first direction relative to the lower frame,
a second actuator that drives the upper frame to move in a second direction relative to the lower frame, the second direction intersecting the first direction,
a third actuator that drives the upper frame to move in the first direction relative to the lower frame, and
a guide ball between the lower frame and the upper frame,
wherein a center of the first actuator is spaced apart in the second direction from a center of the image sensor, and the first and third actuators are located on the same side of the image sensor.

16. The camera module of claim 15, comprising at least one additional guide ball, wherein the guide ball and the at least one additional guide ball are spaced apart from each other in the first direction and the second direction.

17. The camera module of claim 15, wherein
the lower frame provides a lower reception hole that receives the guide ball,
the upper frame provides an upper reception hole on the lower reception hole, and
each of a first length in the first direction of the upper reception hole and a second length in the second direction of the upper reception hole is large enough to allow the guide ball to pass through the upper reception hole in the first and second directions.

18. The camera module of claim 17, wherein each of the first actuator and the second actuator includes a corresponding:
a coil fixed to the lower frame; and
a magnet fixed to the upper frame.

19. The camera module of claim 18, wherein the upper frame includes:
an upper frame body that provides an upper central hole through which the image sensor is exposed; and
an infrared ray color filter (IRCF) coupled to the upper frame body and in the upper central hole,
wherein the magnet is fixed to a bottom surface of the upper frame body.

20. The camera module of claim 18, wherein the lower frame includes:
a ball guide structure; and
a substrate coupled below the ball guide structure,
wherein the substrate provides a lower substrate central hole through which the image sensor is exposed, and
wherein the coil is fixed to a top surface of the substrate.

* * * * *